July 15, 1969 R. E. McCULLOUGH 3,455,104
WATCH RATE REGULATION
Filed Jan. 25, 1968 2 Sheets-Sheet 1
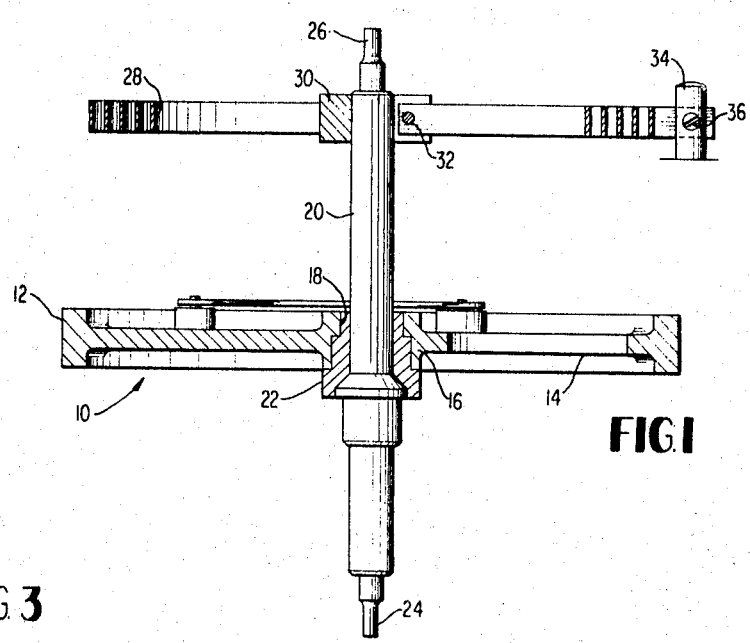
FIG. 1
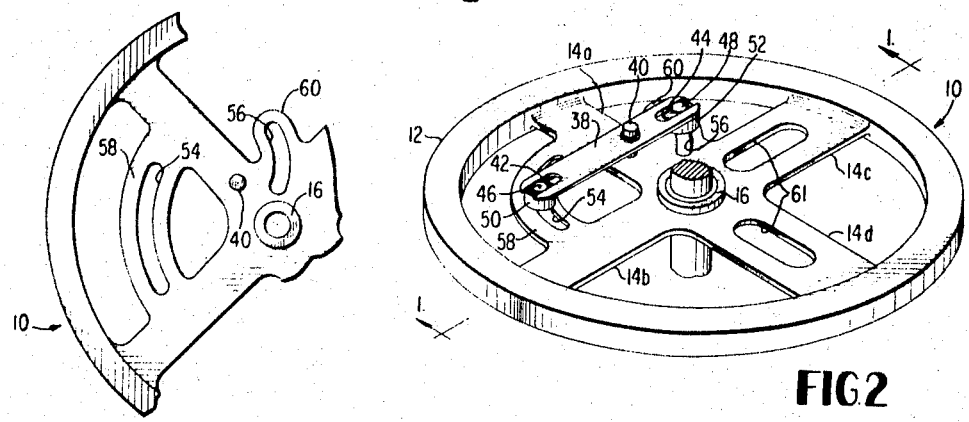
FIG. 3
FIG. 2
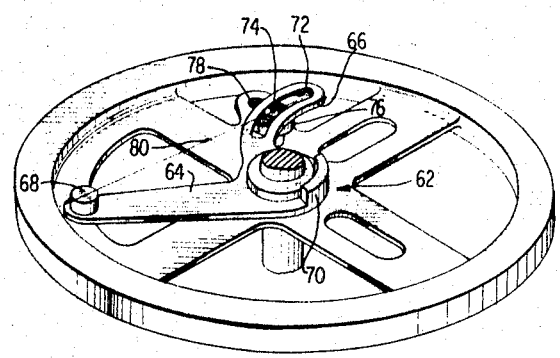
FIG. 4
INVENTOR
ROBERT E. McCULLOUGH
BY Le Blanc & Shur
ATTORNEYS July 15, 1969  R. E. McCULLOUGH  3,455,104
WATCH RATE REGULATION
Filed Jan. 25, 1968
2 Sheets-Sheet 2

INVENTOR
ROBERT E. McCULLOUGH

BY *Le Blanc & Shur*

ATTORNEYS

United States Patent Office 3,455,104
Patented July 15, 1969

3,455,104
WATCH RATE REGULATION
Robert E. McCullough, Lancaster, Pa., assignor to Hamilton Watch Company, Lancaster, Pa., a corporation of Pennsylvania
Filed Jan. 25, 1968, Ser. No. 700,494
Int. Cl. G04b 17/16
U.S. Cl. 58—107                                27 Claims

ABSTRACT OF THE DISCLOSURE

The watch rate regulators hereof in each form provide for simultaneous movement of a pair of weights along curvilinear paths to change the balance wheel moment of inertia while maintaining the center of gravity of the balance wheel constant with respect to the balance wheel axis of rotation. The paths are predetermined such that the center of gravity of the weights remains constant throughout the full range of movement.

BACKGROUND OF THE INVENTION

This invention relates to rate regulation of timepieces and other rotating and oscillating systems and more particularly to a device for regulating the frequency of oscillation of a watch balance wheel.

The timekeeping rate of an ordinary watch, that is how fast or slow it runs, is determined by the frequency of the oscillations of the balance wheel. This frequency depends basically upon two things: the moment of inertia of the balance wheel and the strength of the hairspring. Thus, the watch rate or frequency can be changed by alteration of one or both of either the balance wheel inertia or the hairspring strength.

A common device for controlling watch rate is the so-called watch regulator which comprises a device for altering the effective length of the hairspring so as to change hairspring strength. It has the advantage of being simple in construction while simultaneously permitting large rate corrections. However, slight changes in the location of this regulator along the hairspring result in gross changes in watch rate. The extreme sensitivity of these devices creates uncertainties in the effects of conventional regulator adjustment and makes accurate regulation extremely difficult. Such sensitivity stems from the fact that the hairspring is usually not completely uniform from one short section to the next and from the fact that the regulator depends upon friction for its location and may shift slightly some time after regulation has been accomplished.

Another common regulation device, particularly employed in very good watches provides for so-called meantime screws which do not affect hairspring strength, but rather act to alter the moment of inertia of the balance wheel. Each screw is tightly fitted in the rim of the balance wheel. With this tight fit, the screw will maintain its position even though it is not driven tightly against a stop. By turning these screws, the radial distance of the center of mass of each screw is altered and hence the moment of inertia of the wheel is also altered in a controllable fashion. The principal disadvantage of meantime screw rate regulation is the requirement that the screws be used in pairs. This is because it is necessary that the mass of the balance wheel be so distributed that the center of gravity of the wheel is accurately at the center of rotation. If the center of gravity of the wheel is not on the axis of rotation, gravitational torque exists and this affects the rate in a manner which depends upon the position of the watch. The watch maker refers to this adjustment of the center of gravity of the wheel as "poise." Poising must be done very accurately since large rate errors may result from minor errors in the poise itself. Obviously, if the radial position of one meantime screw is changed, the poise is altered. Therefore, only companion diametrically opposed screws can be altered without changing the poise of the balance wheel.

This required double adjustment in the meantime screw system for regulating a watch balance wheel is a serious disadvantage as it requires the close attention of the person making the correction in rate. If the two corresponding screws are not changed in precisely the same fashion, the poise will be destroyed and the rate of the watch will be erratic from its dependence upon the physical orientation of the watch.

Other elaborate devices have been proposed to permit a change in location of two weights to be made by a single adjustment. However, these have always been based upon the use of movable weights which are on opposite sides of the balance staff and on the same diameter. However, none has been completely satisfactory due to the fact that the diameter passes through the center of the balance wheel circle, which is occupied by the balance staff.

SUMMARY OF THE PRESENT INVENTION

The watch rate regulators of the present invention provide very simple and inexpensive mechanisms which avoid the above-mentioned difficulties and provide for the simultaneous movement of weights to change the balance wheel moment of inertia and thereby its rate while simultaneously maintaining the center of gravity of the balance wheel constant with respect to the balance wheel axis of rotation. It has been found that nonlinear or curvilinear movement of a pair of weights synchronized such that the center of gravity of the weights remains constant at a point offset from the axis of rotation of the balance wheel throughout their full range of movement provides a sensitive adjustment of the moment of inertia and hence rate of rotation of the balance wheel. It has also been found that such curvilinear movement can be accomplished by a single adjustment of the watch rate regulator.

It is therefore a primary object of the present invention to provide an improved device for sensitively adjusting the moment of inertia of an oscillating or rotating system without altering the system's center of gravity with respect to its axis of movement.

It is another object of the present invention to provide a timepiece rate regulator which is simple in construction and method of adjustment.

It is still another object of the present invention to provide a watch rate regulator wherein rate adjustment is accomplished by shifting a pair of weights through the movement of a single member.

It is a further object of the present invention to provide a watch rate regulator wherein one or more of the weights are shifted along curvilinear paths effecting a sensitive adjustment of the moment of inertia of the balance wheel.

It is a still further object of the present invention to provide a watch rate regulator embodied in several forms wherein a pair of weights are simultaneously moved along curvilinear paths to change the balance wheel moment of inertia while maintaining the center of gravity of the weights constant at a point radially offset from the balance wheel axis of rotation throughout their full range of movement.

These and further objects and advantages of the present invention will become more apparent upon reference to the following specification and claims, and appended drawings.

DESCRIPTION OF THE DRAWING FIGURES

FIGURE 1 is vertical cross sectional view of a watch balance wheel and hairspring assembly illustrating one form of a rate regulator constructed in accordance with the present invention;

FIGURE 2 is a perspective view of the regulator illustrated in FIGURE 1;

FIGURE 3 is a fragmentary plan view thereof illustrating the regulator and balance wheel assembly;

FIGURE 4 is a perspective view of another form of rate regulator hereof;

DESCRIPTION OF A PREFERRED EMBODIMENT

Figure 6:
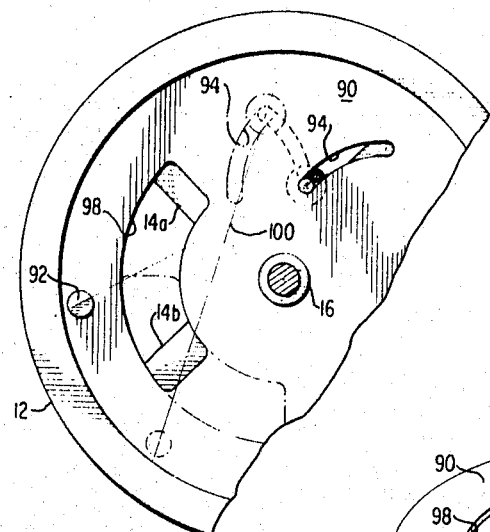
FIGURE 6 is a fragmentary plan view of the rate regulator illustrated in FIGURE 5.

Referring to the drawings and particularly to FIGURE 1, there is shown a balance assembly comprising a balance wheel, generally indicated at 10, including a circular rim 12 joined by a plurality of radial arms 14 to a central hub 16. Hub 16 is apertured as at 18 to receive a balance wheel staff 20, balance wheel 10 being mounted for rotation with staff 20 by a collar 22 carried by the balance staff. Pivots 24 and 26 are provided at the opposite ends of balance staff 20 in the usual manner for reception in suitable bearings in the watch bridge and pillar plate, not shown.

The balance assembly includes a conventional hairspring 28 having its inner end secured to a collar 30 mounted adjacent the upper end of balance staff 20 by a screw 32. The outer end of hairspring 28 is secured to a stationary hairspring stud 34 by a screw 36. Balance wheel 10 may be driven in any suitable manner and, by way of example only, may be driven by an electrical coil mounted thereon to form an electric watch movement of the type shown in Van Horn et al. Patent No. 2,888,797. Reference may be had to that patent for a more detailed description of the balance wheel drive and associated balance assembly structure, it being understood that the present invention is equally applicable to other types of watch and clock constructions incorporating an oscillating element in the nature of a balance wheel.

Referring now particularly to FIGURES 1-3, there is shown one form of the novel watch regulator hereof in conjunction with a balance wheel 10 have four equally spaced radial arms 14a–d joining rim 12 to hub 16. A lever 38 is pivoted intermediate its ends on a pinion 40 carried on radial arm 14a at a point radially spaced from the axis of rotation of balance wheel 10. A pair of lengthwise extending slots 42 and 44 are formed in the opposite ends of lever 38 and receive the pintles 46 and 48 projecting upwardly from a pair of weights 50 and 52, respectively. Pintles, not shown, also project downwardly from the opposite sides of weights 50 and 52 and engage in tracks 54 and 56, respectively, carried by balance wheel 10. It will be noted that the center of gravity of weights 50 and 52 per se lies on a line joining the individual centers of gravity of the weights and, in this instance, such line intersects the pivotal axis 40 of lever 38. It will also be noted that lever 38 is balanced with equal moment arms whereby the center of gravity of the lever-weight system is coincident with pivot 40.

Track 54 comprises a curvilinear slot formed in an arcuate plate portion 58 lying in the plane of radial arms 14a–d and integrally joining arms 14a and 14b. Track 56 comprises a curvilinear slot formed in an integral plate portion 60 lying in the plane of arms 14a–d and extending substantially radially between arms 14a and 14c. It can be seen that rotation of lever 38 about pivot 40 cams or displaces weights 50 and 52 along their respective tracks 54 and 56 with the weights moving lengthwise relative to lever 38 along opposite end slots 42 and 44.

With reference particularly to FIGURE 3, movement of weight 52 along track 56 locates the weight at a greater or lesser distance from the axis of rotation of balance wheel 10 and accordingly alters the moment of inertia of the wheel causing the same to oscillate either faster or slower as the case may be. However, movement of inertia weight 52 along its track 56 as by rotating lever arm 38 also causes weight 50 to move along track 54, thereby counterbalancing the movement of inertia weight 52 and maintaining the center of gravity of the lever-weight system at pivot 40. The arcuate paths of tracks 54 and 56 are predetermined such that as inertia weight 52 moves toward or away from the axis of rotation of the balance wheel assembly thereby altering its moment of inertia, poise weight 50 is shifted so that the center of gravity of the lever-weight system remains at pivot 40.

It will be understood that balance wheel 10 is prepoised to locate the center of gravity of the balance wheel-regulator system coincident with the axis of rotation of the balance wheel-regulator system as, for example, by forming slots 61 in arms 14c and 14d to compensate for the weight of lever 38 pivot 40 and the plate portions 58 and 60 forming tracks 54 and 56, respectively. In this manner, the center of gravity or poise of the balance wheel-regulator system remains constant and coincident with the axis of rotation of balance wheel 10 throughout the full range of movement of weights 50 and 52 along their respective tracks 54 and 56.

In a preferred form of the rate regulator hereof, the ratio of the length of the lever arm from pivot 40 to pintle 46 to the length of the lever arm from pivot 40 to pintle 48 is 2:1 and the mass of weight 52 is twice the mass of weight 50, thus locating the center of gravity of the lever-weight system at pivot 40. In the illustrated regulator, pivot 40 is located such that the arc formed by track 54 is circular with respect to the axis of rotation of balance wheel 10 whereby movement of poise weight 50 compensates only for the change in the center of gravity of the lever-weight system which would otherwise occur by movement of weight 52 in its track 56 and does not change the moment of inertia of balance wheel 10 as weight 50 thus moves along a constant radius with respect to the balance wheel axis of rotation. A net change in the moment of inertia of the balance wheel is accordingly accomplished through the movement of weight 52 toward and away from the axis of rotation of balance wheel 10 without changing the poise thereof. It will be understood that other nonlinear arcuate tracks can be formed and that track 54 need not necessarily comprise the arc of a circle having an axis coincident with the axis of balance wheel 10 provided only that the center of gravity of the lever-weight system is maintained constant throughout the full range of movement of the weights.

In the form of rate regulator illustrated in FIGURE 4, a lever, generally indicated at 62, is pivoted at the center of balance wheel 10 about hub 16 and carries a pair of lever arms 64 and 66. A poise weight 68 is carried on the end of lever arm 64 and rotates on a constant radius about the axis of rotation of balance wheel 10. A counterweight 70 is mounted on the opposite side of the pivotal axis of lever 62 from arms 64 and 66 whereby the center of gravity of lever 62 is coincident with the axis of rotation of balance wheel 10.

The other lever arm 66 carries an arcuate slot formation 72 which receives a pintle 74 projecting upwardly from an inertial weight 76. As in the previous form, a pintle, not shown, projects downwardly from the opposite side of weight 76 and engages in a track 78 formed in an integral plate portion 79 lying on the plane of arms 14a–d and extending substantially radially between arms 14a and 14c. Since the center of gravity of lever 62 coincides with the center of wheel 10, rotation of lever 62 per se about the center of wheel 10 does not change the poise or the moment of inertia of the wheel. However, rotation of arm 62 cams or displaces weight 76 along track 78, effectively shortening or lengthening the radial length of weight 76 from the wheel center, thereby changing the moment of inertia of wheel 10. Track 78 and slot 72 are formed such that the center of gravity of weights 76 and 68 lies at a stationary point indicated at 80 throughout the full range of movement of both weights, the center of gravity 80 lying on a straight line joining the centers of gravity of the individual weights. For example, clockwise rotation of lever 62 causes a shortening of the moment arm between point 80 and poise weight 68 and a proportional shortening of the moment arm between point 80 and inertial weight 76 as the latter is displaced radially inwardly toward the balance wheel center. Thus, weight 68 rotates on a fixed radius with respect to the axis of rotation of the balance wheel without altering the moment of inertia thereof and functions, in this instance, only to maintain the center of gravity of the weights at point 80 as weight 76 shifts radially relative to the balance wheel center to reduce the moment of inertia of the balance wheel assembly. As in the previous form, the balance wheel assembly is also prepoised about its axis of rotation.

Figure 5:
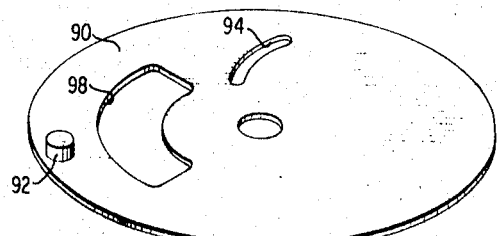
FIGURE 5 is an exploded perspective view of a further form of rate regulator constructed in accordance with the present invention.

Referring now to the form of regulator illustrated in FIGURES 5 and 6, balance wheel 10 has an integral plate portion 84 lying in the plane of arms 14a–d and extending substantially radially between arms 14a and 14c. Plate portion 84 carries an arcuate slot formation 86. The lower pintle of an inertia weight 88 is carried in track 86 whereby weight 88 may be displaced or cammed along track 86 substantially radially outwardly of or inwardly toward the axis of rotation of wheel 10. A disc 90 is pivotally mounted on balance wheel 10 for rotation about an axis coincident with the axis of rotation of wheel 10. A poise weight 92 is carried adjacent the periphery of disc 90 and an arcuate slot formation 94 is formed through disc 90 for receiving a pintle 96 projecting upwardly from weight 88. Disc 90 is prepoised as by cutout portion 98 about the axis of rotation of wheel 10 whereby disc 90 can be rotated relative to wheel 10 about the axis thereof without a change in poise of the disc or the moment of inertia thereof.

Rotation of disc 90 relative to wheel 10 displaces or cams weight 88 inwardly or outwardly along track 86 and slot formation 94 depending on the direction of rotation of disc 90 relative to wheel 10. Rotation of disc 90 also rotates poise weight 92 at a constant radius from the axis of rotation of wheel 10. The slot and track formations and the weights are so formed that the center of gravity of the two weights lies along a line joining the centers of gravity of the individual weights at a fixed point indicated at 100 throughout the full range of movement of the weight. It will be seen that rotation of disc 90 relative to wheel 10 cams inertia weight 88 toward or away from the balance wheel center, thereby changing the moment of inertia of the balance wheel while poise weight 92 rotates on a constant radius without changing the moment of inertia of the system and functions only to compensate for the movement of inertia weight 88 to maintain a constant center of gravity of the two weights at 100 relative to the wheel. As in the previous forms, the balance assembly including the weights is prepoised about the axis of rotation of wheel 10.

Figure 7:
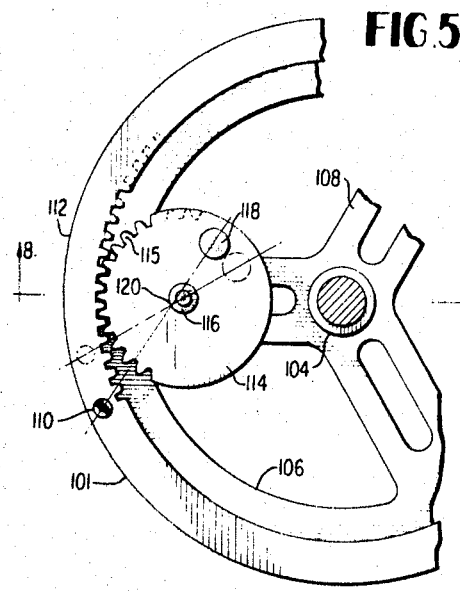
FIGURE 7 is a fragmentary plan view of yet another form of rate regulator.
Figure 8:
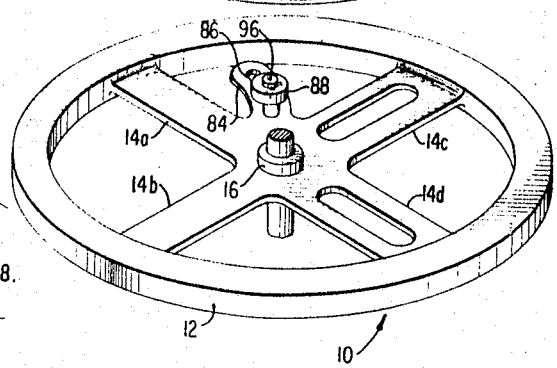
FIGURE 8 is a fragmentary cross sectional view thereof taken about on line 8—8 of FIGURE 7.
Figure 8:
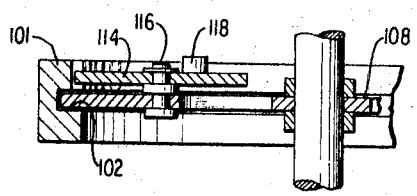

A still further form of watch rate regulator is illustrated in FIGURES 7 and 8. In this form, balance wheel 10 comprises an outer rim 101 having a peripheral slot formation 102 formed along the inner face thereof and an inner rim assembly comprising a hub 104 integrally joined to an inner rim 106 by a plurality of radially extending arms 108. Inner rim 106 is slidably received in slot formation 102 in outer rim 101 providing for relative rotation therebetween. A poise weight 110 is carried by outer rim 101 and may comprise a screw threaded into a suitable tapped opening in an annular face of rim 101. A segment of the inner peripheral face of outer rim 101 between slot formation 102 and the annular rim face is provided with gear teeth 112 for purposes as will become clear.

A gear 114 is rotatably carried on a pin 116 mounted on an arm 108 at a point radially spaced from the wheel axis. The gear teeth 116 on gear 114 mesh with the geared segment 112 on outer rim 101 and an inertia weight 118 is carried by gear 114 at a point radially spaced from the axis 116 of gear 114. The relative masses of poised and inertia weights 110 and 118, respectively, and the relative positions thereof are such as to define equal moments about a theoretical pivot point indicated at 120 and defining the center of gravity of the weights 110 and 118. The balance wheel assembly is prepoised such that its center of gravity is coincident with the axis of rotation of wheel 10.

In use, rotation of gear 114 displaces inertia weight 118 toward or away from the axis of rotation of the balance wheel while simultaneously rotating the inner rim assembly relative to outer rim 101. The former increases or decreases the radial distance between the balance wheel center and inertia weight 118 thereby changing the moment of inertia of the balance wheel assembly causing the same to oscillate in a decreased or increased rate, respectively. As gear 114 is rotated, the meshing teeth 116 thereof cause outer rim 101 to rotate relative to the inner rim assembly, thereby rotating poise weight 110 on a constant radius to compensate for the movement of inertia weight 118. That is, weight 110 will move to counterbalance weight 118 and retain the center of gravity of both weights constant as at point 120 throughout the full range of movement of the weights. This mantains the poise of the balance assembly about the axis of rotation of balance wheel 10. In a preferred form hereof, the distance between point 120 and weight 110 is always twice the distance between point 120 and weight 118 with weight 118 having twice the mass of weight 110, thereby having equal moment arms about theoretical pivot point 120 (center of gravity). Since the balance wheel assembly is prepoised and the center of gravity of weights 110 and 118 remains constant at point 120 throughout their full range of movement, it is seen that the change in the radial distance of weight 118 relative to the balance wheel center causes a change in the moment of inertia of the system without changing the poise of the balance wheel.

In each of the forms hereof, it will be understood that the levers 38 and 62, disc 90 and gear 114 are preferably pivotally mounted on the associated balance wheels by a friction fit, whereby in use the set position of the levers, gear and disc will not be affected by the oscillating movement of the wheel. With this type of fit, the levers, gear and disc may be readily adjusted. It will also be understood that the lever of FIGURE 4, gear and disc may be mounted on the balance staff for rotation therewith by means of a friction fit and rotatable relative to the balance staff for adjusting the weights along the predetermined tracks. With respect to the lever shown in FIGURES 1–3, an arm, not shown, can be mounted for rotation with the balance staff and mount the lever at its outer end by means of a friction fit whereby a like result can be achieved.

It is thus seen that the objects of the invention are fully accomplished in that there is provided watch rate regulators in various forms which are simple in construction, readily and easily adjusted and which require only a single adjustment. Moreover, the present rate regulators provide for movement of weights along curvilinear paths, the weights having a constant center of gravity radially offset from the axis of rotation of the balance wheel throughout the full range of movement of the weights, thereby maintaining the poise of the balance wheel assembly constant and coincident with the axis of rotation thereof.

3,455,104

The invention may be embodied in other specific forms without departing from the spirit or essential characteristics thereof.

What is claimed and desired to be secured by U.S. Letters Patent is:

1. Apparatus for changing the moment of inertia of a rotatable body about its rotational axis without changing its center of gravity with respect thereto comprising a pair of weights carried by said body, said weights being located in a first position with the center of gravity thereof spaced from the rotational axis of said body, means for displacing said weights along separate predetermined paths for locating said weights in a second position, at least one of said weights being displaced from said first position along a curvilinear path to said second position, said weigths having a center of gravity in said second position coincident with the center of gravity of said weights when in said first position, and effecting a change in the moment of inertia of said body when displaced from said first position to said second position.

2. Apparatus according to claim 1 wherein the paths of movement of said weights are selected such that the moments of each of said weights in a plane normal to the axis of rotation of said body and about the center of gravity of said weights are equal throughout the full range of displacement of said weights between said first and second positions.

3. Apparatus according to claim 1 wherein both of said weights are displaced from said first position along curvilinear paths to said second position.

4. Apparatus according to claim 1 wherein said displacing means comprises means for moving said weights simultaneously.

5. Apparatus according to claim 1 wherein both of said weights are movable along curvilinear paths, said displacing means comprising means for moving said weights simultaneously along curvilinear paths, one of said weights being movable along the arc of a circle having its center coincident with the axis of rotation of said body.

6. Apparatus according to claim 1 wherein said displacing means comprises a lever pivotally carried by said body at a point spaced from the axis of rotation of said body, opposite end portions of said lever engaging said weights for simultaneous movement of said weights along said predetermined paths in response to rotation of said lever.

7. Apparatus according to claim 6 wherein the pivotal axis of said lever is coincident with the center of gravity of said weights.

8. Apparatus according to claim 6 wherein said displacing means includes means forming a pair of tracks along said body, said weights lying in following engagement along said tracks and movable therealong in response to pivotal movement of said lever.

9. Apparatus according to claim 8 wherein the opposite end portions of said lever have a pair of lengthwise extending slot formations, and cooperative means on said weights engaging in said slot formations whereby said weights are movable lengthwise along said lever as said weights move in following engagement along said tracks.

10. Apparatus according to claim 9 wherein both of said tracks are curvilinear, one of said tracks forming the arc of a circle having its center coincident with the axis of rotation of said body.

11. Apparatus according to claim 1 wherein said displacing means comprises a lever mounted for rotation with said body and rotatable relative thereto about an axis coincident with the axis of rotation of said body, opposite end portions of said lever being adapted to simultaneously displace said weights along said predetermined paths.

12. Apparatus according to claim 11 wherein said one weight is carried by one of said lever end portions for curvilinear movement on a constant radius with respect to the axis of rotation of said body.

13. Apparatus according to claim 12 including means guiding the other of said weights for movement along a curvilinear path between said first and second positions, said latter path extending in a direction effecting a change in the radial distance between the axis of rotation of said body and said other weight when moved between said first and second positions.

14. Apparatus according to claim 13 including a track carried by said body defining said last mentioned curvilinear path, said other weight lying in following engagement along said track, and curvilinear means carried by the other of said lever end portions and engaging said other weight for displacing the latter along said track.

15. Apparatus according to claim 14 wherein said other end portion curvilinear means includes a slot formation, cooperative guide means on said other weight engaging in said slot formation for sliding movement therealong, said slot formation overlying said track and having a curvature reverse from the curvature of said curvilinear track.

16. Apparatus according to claim 1 wherein said displacing means comprises a substantially planar member rotatably mounted on said body and having an axis of rotation coincident with the axis of rotation of said body, one of said weights being carried by said member and the other of said weights being carried by said body, and means carried by said member for displacing said other weight along its predetermined path in response to relative rotation between said member and said body.

17. Apparatus according to claim 16 wherein said planar member comprises a disc and said displacing means includes a curvilinear track carried by said body and a curvilinear slot carried by said disc, means on said other member engageable in said track and slot whereby relative rotation between said disc and body displaces said other weight along said track.

18. Apparatus according to claim 1 wherein said body comprises outer and inner body portions movable relative to one another, one of said weights being carried by said outer portion, a member rotatably carried by said inner portion and carrying the other of said weights, and means engaging between said member and said outer portion for rotating said outer portion with respect to said inner portion in response to rotation of said member whereby said weights maintain a constant center of gravity when displaced from said first position to said second position.

19. Apparatus for changing the rate of oscillation of a balance assembly without affecting its poise comprising a balance staff, a balance wheel carried by said staff, means for oscillating and sustaining the oscillations of said balance wheel, a pair of weights carried by said balance wheel, said weights being located in a first position with the center of gravity thereof spaced from the axis of rotation of the balance wheel, means for displacing said weights along separate predetermined paths for locating said weights in a second position, at least one of said weights being displaced from said first position along a curvilinear path to said second position, said weights having a center of gravity in said second position coincident with the center of gravity of said weights when in said first position and effecting a change in the moment of inertia of said balance wheel when displaced from said first position to said second position.

20. Apparatus according to claim 19 wherein said displacing means comprises a lever pivotally carried by said balance wheel at a point spaced from the axis of rotation of said balance wheel, track means carried by said balance wheel defining a pair of curvilinear paths, cooperative means carried by said weights engaging said track means and the opposite end portions of said lever whereby rotation of said lever displaces said weights from said first position along said track means to said second position.

21. Apparatus according to claim 20 wherein said track means include a pair of curvilinear slots formed in said balance wheel, the opposite end portions of said lever having substantially lengthwise extending slot formations formed therealong, said cooperating means engaging in said lever slot formations and said balance wheel slots.

22. Apparatus according to claim 19 wherein said displacing means comprises a lever mounted for rotation with said balance assembly and rotatable relative thereto about an axis coincident with the axis of rotation of said balance wheel, one end portion of said lever carrying one of said weights, track means on said balance wheel, cooperative means carried by said other weight engaging in said track means and the opposite end portion of said lever whereby rotation of said lever relative to said balance wheel displaces said other weight from said first position along said track means to said second position.

23. Apparatus according to claim 22 wherein said cam means comprises a curvilinear slot formed in said balance wheel, the other lever end portion having a curvilinear slot formed therein, said cooperative means engaging within said balance wheel and lever slots for guiding said other weight along said balance wheel slot.

24. Apparatus according to claim 19 wherein said displacing means comprises a disc pivotally mounted for rotation with said balance assembly and rotatable relative thereto about an axis coincident with the axis of rotation of said balance wheel, one of said weights being carried by said disc adjacent a peripheral portion thereof, track means on said balance wheel, said disc having a curvilinear slot formation, cooperative means carried by said other weight engaging said track means and the slot formation on said disc whereby rotation of said disc relative to said balance wheel displaces said other weight along said track means from said first position to said second position.

25. Apparatus according to claim 19 wherein said balance wheel comprises an inner wheel assembly and an outer rim rotatably carried by said inner wheel assembly, and a member rotatably carried by said inner wheel assembly and drivingly connected to said outer rim, one of said weights being carried by said outer rim, the other of said weights being carried by said member and spaced from the pivotal axis of said member.

26. Apparatus according to claim 25 wherein said member is rotatably carried by said inner wheel assembly at a point radially spaced from the axis of rotation of said balance wheel.

27. Apparatus according to claim 26 including gear teeth formed along an inner peripheral portion of said outer rim, said member comprising a gear having teeth in mesh with said rim gear teeth.

References Cited

UNITED STATES PATENTS 2,770,942   11/1956   Fauret _____ 58—107
2,880,570   4/1959   Fauret _____ 58—107

RICHARD B. WILKINSON, Primary Examiner

S. A. WAL, Assistant Examiner

U.S. Cl. X.R.

74—572